United States Patent
Arai

(10) Patent No.: US 10,897,581 B2
(45) Date of Patent: Jan. 19, 2021

(54) IMAGE CAPTURING APPARATUS, IMAGE COMPOSITING METHOD, AND RECORDING MEDIUM HAVING RECORDED THEREIN IMAGE COMPOSITING PROGRAM TO BE EXECUTED BY COMPUTER OF IMAGE CAPTURING APPARATUS

(71) Applicant: Olympus Corporation, Hachioji (JP)

(72) Inventor: Hirozumi Arai, Tokyo (JP)

(73) Assignee: Olympus Corporation, Tokyo (JP)

( * ) Notice: Subject to any disclaimer, the term of this patent is extended or adjusted under 35 U.S.C. 154(b) by 0 days.

(21) Appl. No.: 16/711,372

(22) Filed: Dec. 11, 2019

(65) Prior Publication Data

US 2020/0236299 A1  Jul. 23, 2020

(30) Foreign Application Priority Data

Jan. 17, 2019 (JP) .................... 2019-005624

(51) Int. Cl.
*H04N 5/243* (2006.01)
*G06T 7/11* (2017.01)
(Continued)

(52) U.S. Cl.
CPC ............. *H04N 5/243* (2013.01); *G06T 5/50* (2013.01); *G06T 7/11* (2017.01); *H04N 5/2351* (2013.01);
(Continued)

(58) Field of Classification Search
CPC .. H04N 5/243; H04N 5/23218; H04N 5/2351; H04N 5/23216; H04N 5/23245;
(Continued)

(56) References Cited

U.S. PATENT DOCUMENTS 8,493,468 B2 * 7/2013 Nomura .................. H04N 5/235
   348/223.1
8,792,016 B2 * 7/2014 Guan ..................... H04N 9/735
   348/223.1

(Continued)

FOREIGN PATENT DOCUMENTS

JP  2003-087645 A  3/2003
JP  2004-214836 A  7/2004
(Continued)

OTHER PUBLICATIONS

Notification of Reasons for Rejection to corresponding Japanese Patent Application No. 2019-005624, dated Mar. 3, 2020 (5 pgs.), with translation (4 pgs.).

*Primary Examiner* — Pritham D Prabhakher
(74) *Attorney, Agent, or Firm* — John C. Pokotylo; Pokotylo Patent Services

(57) ABSTRACT

An image capturing apparatus includes: an image capturing circuit that outputs image capturing data by capturing an image of a photogenic field; a boundary determination circuit that determines a boundary between first and second photogenic-field regions within a first image pertaining to image capturing data output by the image capturing circuit capturing an image of the photogenic field under a first image capturing condition; an image extraction circuit that extracts a partial image corresponding to the second photogenic-field region from a second image on the basis of the boundary; and an image compositing circuit that composites the first image and the partial image.

18 Claims, 12 Drawing Sheets

(51) Int. Cl.
*G06T 5/50* (2006.01)
*H04N 5/232* (2006.01)
*H04N 5/235* (2006.01)

(52) U.S. Cl.
CPC ..... *H04N 5/23216* (2013.01); *H04N 5/23218* (2018.08); *G06T 2207/20221* (2013.01)

(58) Field of Classification Search
CPC ......... H04N 5/232123; H04N 5/23212; H04N 5/232127; G06T 7/11; G06T 5/50; G06T 2207/20221; G02B 7/282; G02B 7/36; G02B 7/38; G03B 13/06; G03B 13/16; G03B 13/36
USPC .......................................................... 348/223.1
See application file for complete search history.

(56) References Cited

U.S. PATENT DOCUMENTS

| | | | |
|---|---|---|---|
| 8,823,829 B2* | 9/2014 | Imai | H04N 9/045 348/223.1 |
| 8,947,555 B2* | 2/2015 | Velarde | H04N 9/735 348/223.1 |
| 9,591,231 B2* | 3/2017 | Ueyama | H04N 5/2351 |
| 9,871,976 B2* | 1/2018 | Nomura | H04N 5/23238 |
| 10,302,901 B2* | 5/2019 | Mohri | G02B 7/38 |
| 10,303,943 B2* | 5/2019 | Revell | B64D 43/00 |
| 10,339,405 B2* | 7/2019 | Saitou | G06T 7/11 |
| 10,477,106 B2* | 11/2019 | Nomura | H04N 5/2253 |
| 2011/0050950 A1* | 3/2011 | Nomura | H04N 9/735 348/224.1 |
| 2011/0298946 A1* | 12/2011 | Guan | H04N 5/235 348/223.1 |
| 2015/0350572 A1* | 12/2015 | Hattori | H04N 5/332 250/332 |
| 2016/0117803 A1* | 4/2016 | Ueyama | G06T 5/002 382/274 |
| 2016/0188994 A1* | 6/2016 | Wu | G06T 7/593 382/195 |
| 2017/0026568 A1* | 1/2017 | Haehnichen | F16M 13/04 |
| 2017/0372120 A1* | 12/2017 | Revell | B64D 47/08 |
| 2018/0120534 A1 | 5/2018 | Mohri | |
| 2018/0167594 A1* | 6/2018 | Osawa | H04N 9/643 |
| 2018/0247148 A1* | 8/2018 | Saitou | H04N 5/232 |
| 2019/0206058 A1* | 7/2019 | Okada | G06T 5/50 |
| 2019/0373167 A1* | 12/2019 | Liu | H04N 5/23293 |

FOREIGN PATENT DOCUMENTS

| | | |
|---|---|---|
| JP | 2013-258444 A | 12/2013 |
| JP | 2015-041869 A | 3/2015 |
| JP | 2015-082675 A | 4/2015 |
| JP | 2018-072554 A | 5/2018 |

* cited by examiner

IMAGE CAPTURING APPARATUS, IMAGE COMPOSITING METHOD, AND RECORDING MEDIUM HAVING RECORDED THEREIN IMAGE COMPOSITING PROGRAM TO BE EXECUTED BY COMPUTER OF IMAGE CAPTURING APPARATUS

CROSS-REFERENCE TO RELATED APPLICATIONS

This application is based upon and claims the benefit of priority of the prior Japanese Patent Application No. 2019-005624, filed on Jan. 17, 2019, the entire contents of which are incorporated herein by reference.

FIELD

Embodiments are related to an image capturing apparatus, an image compositing method implemented by the image capturing apparatus, and a recording medium having recorded therein an image compositing program to be executed by a computer of the image capturing apparatus.

BACKGROUND

It has been difficult to take a star view picture showing starry sky and a land view (e.g., mountain) with optimum brightness by using an image capturing apparatus such as a digital camera. This is because performing image shooting adapted for starry sky will result in an exposure appropriate for the starry sky, thereby acquiring a star view image showing a land view with low brightness, while performing image shooting adapted for a land view will result in an exposure appropriate for the land view, thereby acquiring a star view image showing starry sky with excessively high brightness.

Accordingly, photographers acquire a plurality of star view images by performing image shooting a plurality of times with different exposures and select, from these pictures, a star view image for starry sky and that for a land view. Then, they use, for example, image editing software to extract necessary partial images from the selected pictures and composite these partial images, thereby creating a star view image showing both the starry sky and the land view with optimum brightness.

Shooting a star view image by using an image capturing apparatus with settings adapted for starry sky may involve image processing that depends on a tone curve appropriate for the starry sky, while performing image shooting with settings adapted for a land view may involve image processing that depends on a tone curve appropriate for the land view. Also in this case, performing image shooting adapted for starry sky will provide a star view image showing a land view with low brightness, and performing image shooting adapted for a land view will provide a star view image showing starry sky with excessively high brightness.

An image capturing apparatus with a high dynamic range (HDR) function may shoot star view images by using this function. However, the processing under the HDR function is performed with the balance in brightness between starry sky and a land view considered, and a star view image showing both the starry sky nor the land view with non-optimum brightness could be acquired.

Shooting a star view image by using an image capturing apparatus with settings adapted for starry sky may involve image processing that depends on white balancing (WB) appropriate for the starry sky, while performing image shooting with settings adapted for a land view may involve image processing that depends on WB appropriate for the land view. The WB appropriate for starry sky is, for example, one for increasing blueness by about 3000 kelvins (K), and the WB appropriate for a land view is, for example, auto white balancing (AWB). In this case, performing image shooting adapted for starry sky will provide a star view image with a land view having unnaturally increased blueness.

Accordingly, each individual region within the screen needs to have a different image brightness, color representation, and balance therebetween. Hence it has been difficult to perform optimum image shooting for each region within the screen.

An image capturing apparatus that shoots an image of a subject with appropriate brightness has been proposed (see Japanese Laid-open Patent Publication No. 2015-041869). This image capturing apparatus includes: an image generation means for generating a plurality of images having different luminance levels; a compositing-condition generation means for generating, from the luminance level of a first image generated by the image generation means, a compositing condition pertaining to the compositing of a plurality of images generated by the image generation means; and a compositing means for compositing the plurality of images on the basis of the compositing condition generated by the compositing-condition generation means, wherein the compositing-condition generation means scales down the first image until a photogenic-subject image having an area less than a preset threshold among the photogenic-subject images included in the first image is separated by a separation means for separating a photogenic-subject image from the first image in accordance with the size of the photogenic-subject image, and generates a compositing condition by using the scaled-down first image. For example, the compositing-condition generation means may include a binarization means for binarizing a scaled-down image on the basis of luminance level information of this image and an enlargement means for enlarging the image binarized by the binarization means back to the original size, thereby providing the image enlarged by the enlargement means as a compositing condition.

SUMMARY

In an aspect of embodiments, an image capturing apparatus includes: an image capturing circuit that outputs image capturing data by capturing an image of a photogenic field; a boundary determination circuit that determines a boundary between first and second photogenic-field regions within a first image pertaining to image capturing data output by the image capturing circuit capturing an image of the photogenic field under a first image capturing condition; an image extraction circuit that extracts a partial image corresponding to the second photogenic-field region from a second image on the basis of the boundary; and an image compositing circuit that composites the first image and the partial image.

In another aspect of embodiments, an image compositing method implemented by an image capturing apparatus that includes an image capturing circuit for outputting image capturing data by capturing an image of a photogenic field includes: determining a boundary between first and second photogenic-field regions within a first image pertaining to image capturing data output by the image capturing circuit capturing an image of the photogenic field under a first image capturing condition; performing, for the first image, first image processing appropriate for the first photogenic-field region and performing, for a second image, second image processing appropriate for the second photogenic-field region, the second image pertaining to image capturing data output by the image capturing circuit capturing an image of the photogenic field under a second image capturing condition appropriate for the second photogenic-field region; extracting a partial image corresponding to the second photogenic-field region from the second image after the second image processing on the basis of the boundary; and compositing the first image after the first image processing and the partial image.

In still another aspect of embodiments, a non-transitory computer-readable recording medium has recorded therein an image compositing program to be executed by a computer of an image capturing apparatus that includes an image capturing circuit for outputting image capturing data by capturing an image of a photogenic field, the program causing the computer to execute a process that includes: determining a boundary between first and second photogenic-field regions within a first image pertaining to image capturing data output by the image capturing circuit capturing an image of the photogenic field under a first image capturing condition; performing, for the first image, first image processing appropriate for the first photogenic-field region and performing, for a second image, second image processing appropriate for the second photogenic-field region, the second image pertaining to image capturing data output by the image capturing circuit capturing an image of the photogenic field under a second image capturing condition appropriate for the second photogenic-field region; extracting a partial image corresponding to the second photogenic-field region from the second image after the second image processing on the basis of the boundary; and compositing the first image after the first image processing and the partial image.

DESCRIPTION OF EMBODIMENTS

Figure 1:
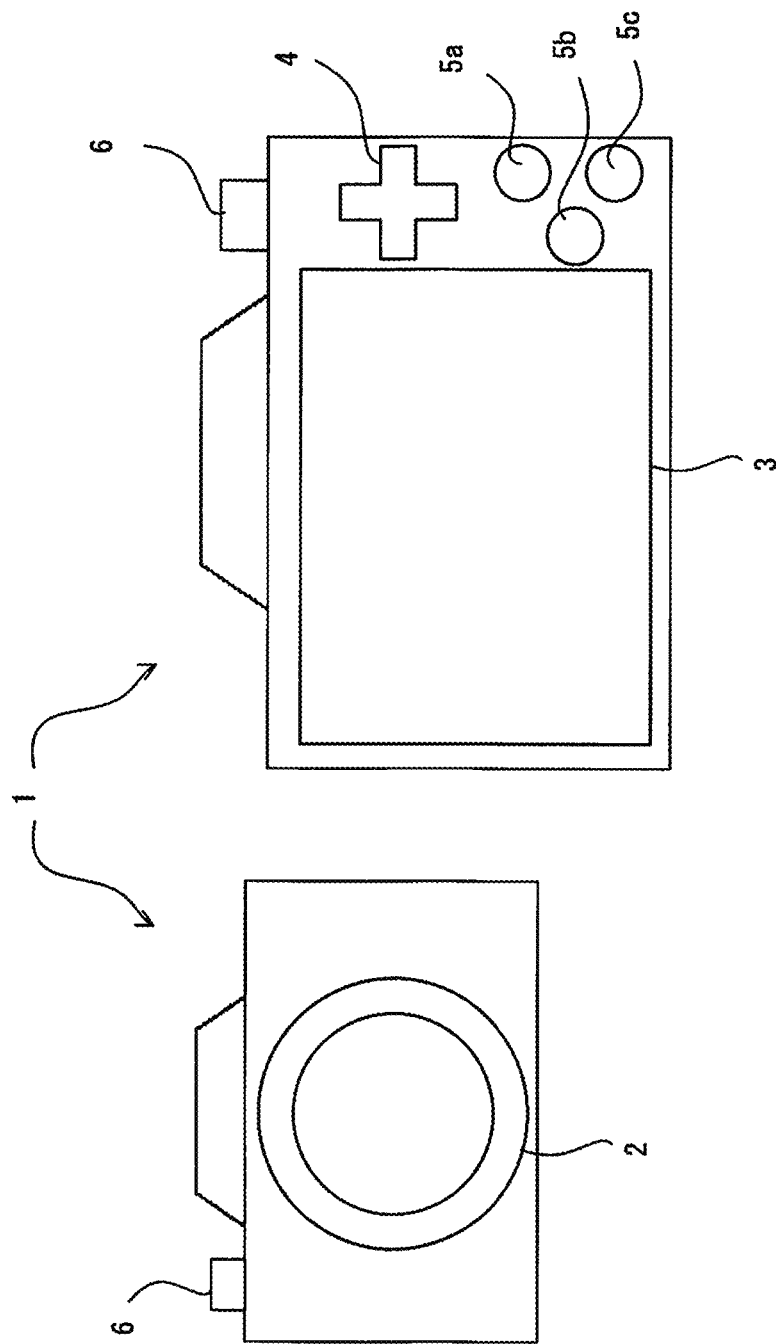
FIG. 1 exemplifies the outer appearance configurations of the front and back surfaces of an image capturing apparatus in accordance with an embodiment.

Extracting and compositing images by using the above-described image editing software so as to provide a star view image showing both starry sky and a land view with optimum brightness will be troublesome and take a long time. Meanwhile, if the processes of separation, scale-down, binarization, and enlargement are used as seen in the case of the image capturing apparatus described in Japanese Laid-open Patent Publication No. 2015-041869, a boundary between starry sky and a land view that has a complicated shape could not be accurately reproduced.

In view of the situations described above, embodiments described in the following provide an image capturing apparatus, image compositing method, and image compositing program for allowing a star view image to be easily acquired in which both starry sky and a land view are shown with optimum brightness and the boundary between the starry sky and the land view is accurately reproduced.

The following describes embodiments by referring to the drawings.

FIG. 1 exemplifies the outer appearance configurations of the front and back surfaces of an image capturing apparatus in accordance with an embodiment. The outer appearance configurations of the front and back surfaces are respectively exemplified on the left and right sides in FIG. 1.

The image capturing apparatus 1 exemplified in FIG. 1 is, but is not limited to, a lens-interchangeable or lens-integrated digital camera. For example, the image capturing apparatus 1 may be a camera installed in a portable information terminal apparatus such as a smartphone or a tablet terminal.

As exemplified in FIG. 1, the image capturing apparatus 1 includes a lens unit 2 on the front surface thereof. The lens unit 2 includes an image shooting optical system such as an image shooting lens.

The image capturing apparatus 1 also includes a display unit 3, a D-pad 4, and a plurality of buttons 5 (5a, 5b, 5c) on the back surface thereof. The display unit 3 is, for example, a liquid crystal display or an organic electro-luminescence (EL) display and displays images, various screens, and the like. The D-pad 4 is used to, for example, give an instruction for selection of an image displayed on the display unit 3 or an item within the screen. The plurality of buttons 5 include an acceptance button 5a used to give an instruction to accept an image or item for which an instruction for selection has been given using the D-pad 4, a power button 5b used to give an instruction to turn on or off the image capturing apparatus 1, and a button 5c used to give a predetermined instruction.

The image capturing apparatus 1 includes a release button 6 on the upper surface thereof. The release button 6 is used to give an instruction to perform image shooting.

Figure 2:
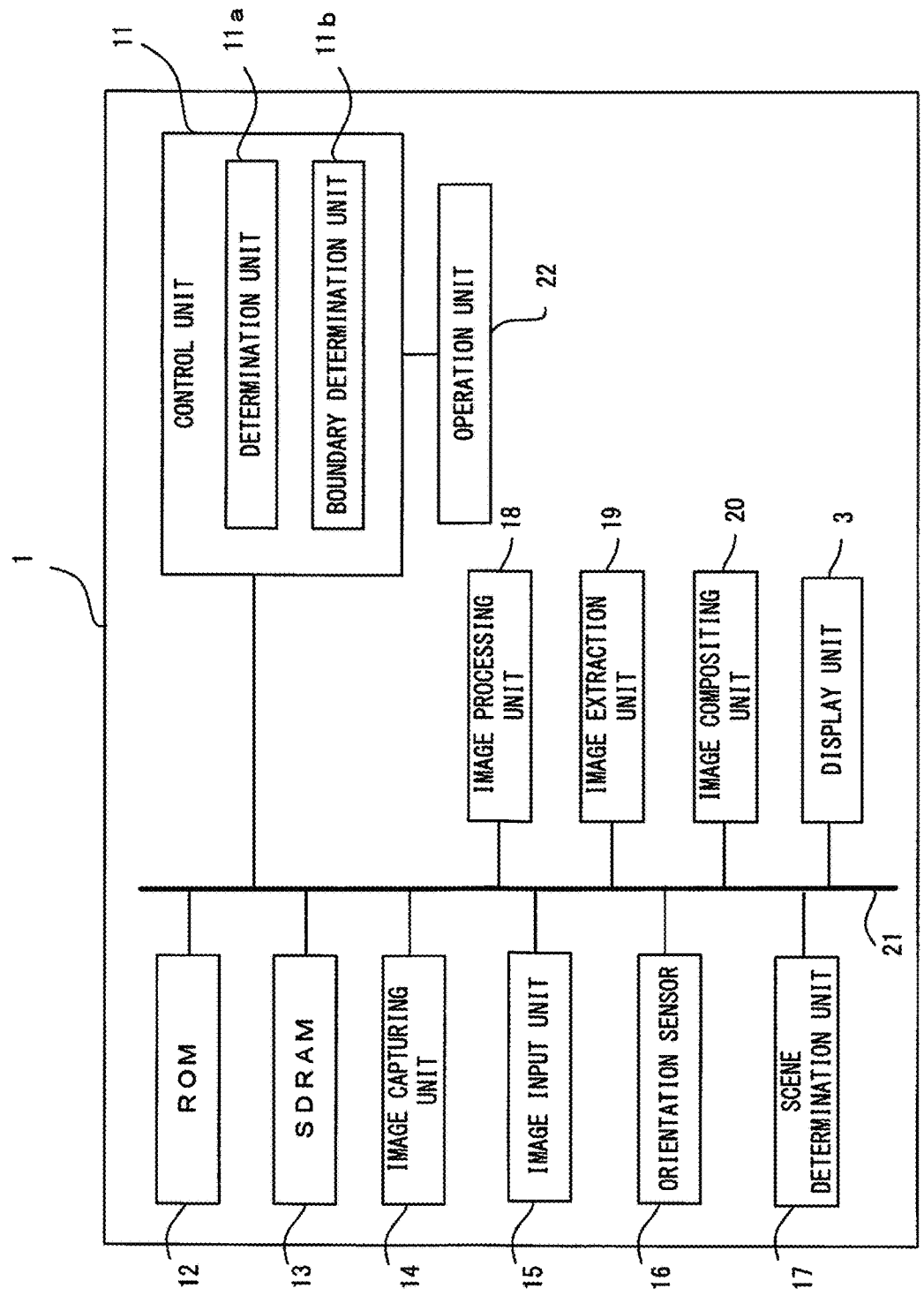
FIG. 2 exemplifies main components of an image capturing apparatus in accordance with an embodiment.

FIG. 2 exemplifies main components of an image capturing apparatus in accordance with an embodiment.

An image capturing apparatus 1 exemplified in FIG. 2 includes a control unit 11, a read only memory (ROM) 12, a synchronous dynamic random access memory (SDRAM) 13, an image capturing unit 14, an image input unit 15, an orientation sensor 16, a scene determination unit 17, an image processing unit 18, an image extraction unit 19, an image compositing unit 20, and a display unit 3, all of which are connected to a bus 21. Hence, data can be transmitted or received between the components connected to the bus 21. The image capturing apparatus 1 also includes an operation unit 22 connected to the control unit 11.

The control unit 11 controls the entirety of the image capturing apparatus 1. For example, the control unit 11 may control execution of processing that depends on an instruction signal from the operation unit 22.

The control unit 11 includes a determination unit 11a and a boundary determination unit 11b.

The determination unit 11a determines whether the proportion of regions that do not fall within a predetermined luminance-level range within a first image pertaining to image capturing data output by the image capturing unit 14 capturing an image of a photogenic field under a first image capturing condition is equal to or greater than a threshold. The first image capturing condition is, for example, an exposure decided in accordance with a photogenic field that is an object for which an image is to be shot (object for which an image is to be captured) when the release button 6 is pressed.

The boundary determination unit 11b determines the boundary between first and second photogenic-field regions within the first image. For example, the boundary determination unit 11b may determine the boundary by linking intermediate positions that are each a midpoint between a pair of pixels within the first image that are adjacent to each other in a specific direction and have a difference in luminance value therebetween equal to or greater than a threshold. Alternatively, the boundary determination unit 11b may determine the boundary by linking intermediate positions that are each a midpoint between a pair of pixels that are adjacent to each other in a specific direction with one or more pixels located therebetween and have a difference in luminance value therebetween equal to or greater than a threshold. In either case, the first photogenic-field region includes pixels that are each a pixel of the pair of pixels that have the higher luminance value than the other pixel of the pair of pixels, and the second photogenic-field region includes pixels that are each a pixel of the pair of pixels that have the lower luminance value than the other pixel of the pair of pixels. For example, the specific direction may be decided on the basis of the gravity direction of a photogenic field indicated in the first image. In this case, the specific direction may be decided on the basis of specific-direction definition information defining a specific direction that depends on the gravity direction or may be a direction opposite to the gravity direction. The gravity direction is decided on the basis of, for example, a result of detection by the orientation sensor 16. The first photogenic-field region corresponds to, for example, starry sky, and the second photogenic-field region corresponds to, for example, a land view.

The control unit 11 is implemented by a processor such as a central processing unit (CPU). This processor may execute programs (including an image compositing program) stored in the ROM 12 so as to implement functions of the control unit 11 such as the determination unit 11a and the boundary determination unit 11b. The programs to be executed by the processor of the control unit 11 include programs for controlling and executing the functions of the image capturing apparatus 1 and programs to be executed by the computer of the image capturing apparatus 1.

The ROM 12 stores programs to be executed by the processor of the control unit 11 and data (including specific-direction definition information) necessary to execute such programs.

For example, the SDRAM 13 may be used as a work area for the control unit 11 and temporarily store information on a boundary determined by the boundary determination unit 11b.

The image capturing unit 14 captures an image of a photogenic field and outputs image capturing data. Specifically, the image capturing unit 14 includes an image capturing element and a signal processing unit, causes the image capturing element to capture an image of an optical image of a photogenic field that is incident via the lens unit 2, causes the signal processing unit to perform predetermined signal processing for an image capturing signal that is a result of the image capturing, and outputs image capturing data that is a result of the signal processing. The image capturing element is an image sensor, e.g., a charge coupled device (CCD) or a complementary metal oxide semiconductor (CMOS). The predetermined signal processing includes a gain adjustment process and an analog-to-digital (AD) conversion process. The signal processing unit of the image capturing unit 14 may be implemented by a circuit. In this case, the image capturing unit 14 may be configured as an image capturing processing circuit that includes an image capturing element and a signal processing circuit.

The image input unit 15 may be an interface used to input an image to the image capturing apparatus 1, e.g., an interface to which an SD memory card having images recorded therein is connected. Alternatively, the image input unit 15 may be, for example, a USB interface to which a universal serial bus (USB) memory having images recorded therein is connected.

The orientation sensor 16 detects the orientation of the image capturing apparatus 1. For example, the orientation sensor 16 may be a three-axis acceleration sensor and can detect a gravity direction. Thus, the gravity direction of a photogenic field indicated in the first image can be detected.

The scene determination unit 17 determines the scene of a photogenic field for which image shooting (image capturing) is performed. For example, the scene determination unit 17 may determine whether the scene of a photogenic field for which image shooting is performed is a celestial scene. This determination is made on the basis of, for example, image capturing data output by the image capturing unit 14 capturing an image of the photogenic field.

The image processing unit 18 preforms various types of image processing. For example, the image processing unit 18 performs, for the first image, first image processing appropriate for the first photogenic-field region and perform, for a second image, second image processing appropriate for the second photogenic-field region, the second image pertaining to image capturing data output by the image capturing unit 14 capturing an image of the photogenic field under a second image capturing condition appropriate for the second photogenic-field region. The first image processing includes, for example, one of or both image processing that depends on a tone curve appropriate for starry sky and image processing that depends on WB appropriate for starry sky. The second image processing includes, for example, one of or both image processing that depends on a tone curve appropriate for a land view and image processing that depends on WB appropriate for the land view.

The image extraction unit 19 extracts a partial image from an image. For example, the image extraction unit 19 may extract a partial image corresponding to the second photogenic-field region from the second image after the second image processing on the basis of the boundary determined by the boundary determination unit 11b.

The image compositing unit 20 composites images. For example, the image compositing unit 20 may composite the first image after the first image processing and a partial image extracted by the image extraction unit 19 from the second image after the second image processing.

The operation unit 22 accepts a user operation and outputs an instruction signal that depends on this operation to the control unit 11. The operation unit 22 includes the D-pad 4, the plurality of buttons 5, and the release button 6. The operation unit 22 may include a touch panel. In this case, the touch panel is located on the display unit 3.

For example, the scene determination unit 17, image processing unit 18, image extraction unit 19, and image compositing unit 20 of the image capturing apparatus 1 exemplified in FIG. 2 may be implemented by a circuit. The control unit 11 may include the scene determination unit 17, the image processing unit 18, the image extraction unit 19, and the image compositing unit 20. In this case, the scene determination unit 17, the image processing unit 18, the image extraction unit 19, and the image compositing unit 20 are also implemented by the processor of the control unit 11 executing the program stored in the ROM 12.

Some of the components of the image capturing apparatus 1 exemplified in FIG. 2 (e.g., control unit 11, scene determination unit 17, image processing unit 18, image extraction unit 19, and image compositing unit 20) may be implemented by an integrated circuit such as an application specific integrated circuit (ASIC) or a field programmable gate array (FPGA).

Figure 3:
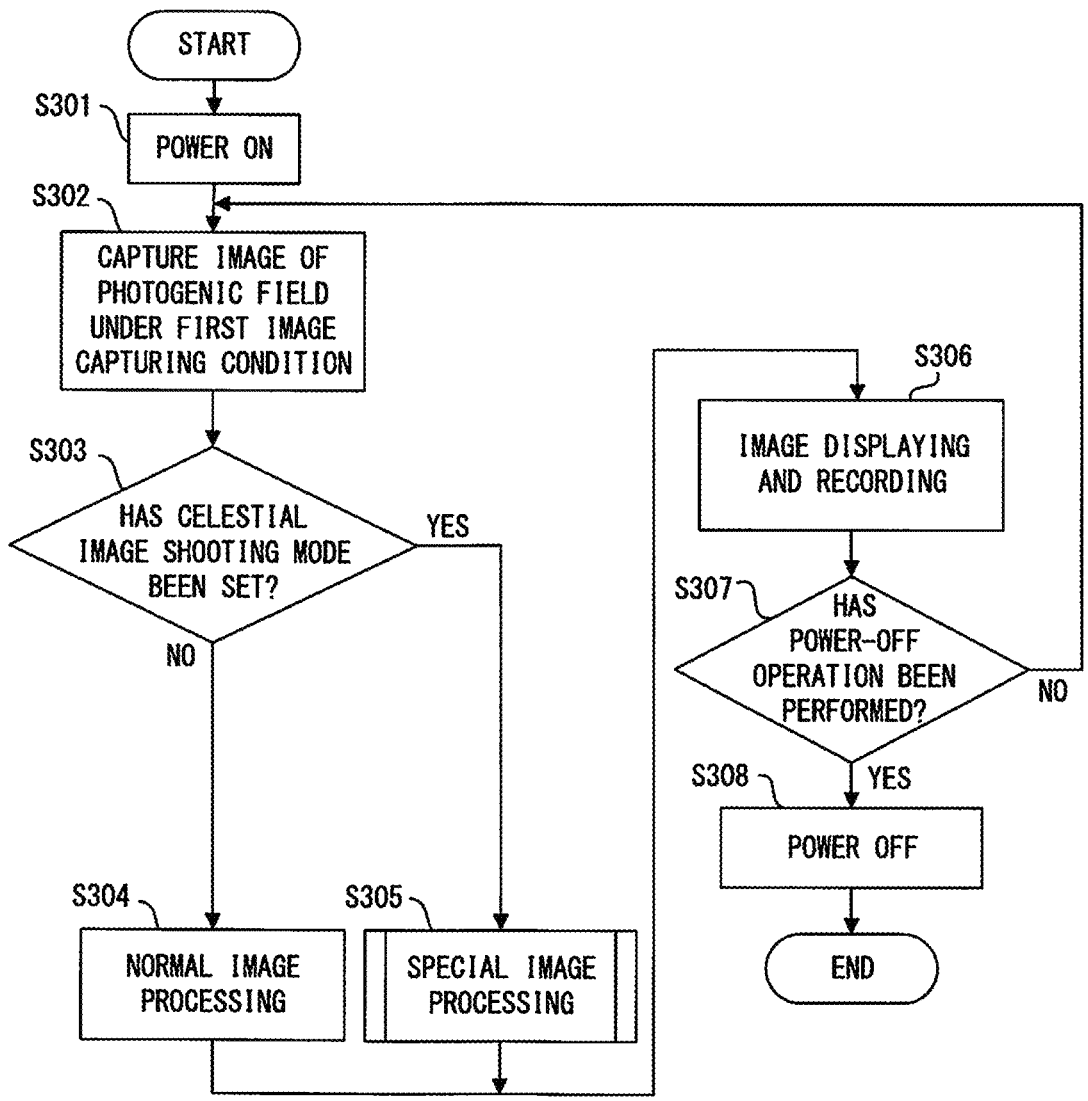
FIG. 3 is a flowchart exemplifying a process performed by an image capturing apparatus in accordance with an embodiment.

FIG. 3 is a flowchart exemplifying a process performed by an image capturing apparatus in accordance with an embodiment. This process allows a star view image to be easily shot in which both starry sky and a land view are shown with optimum brightness and the boundary between the starry sky and the land view is accurately reproduced.

In the process exemplified in FIG. 3, the image capturing apparatus 1 is turned on in response to the power button 5b being pressed (power-on operation) (S301), and then, when the release button 6 is pressed (image-shooting instruction operation), the image capturing unit 14 captures an image of a photogenic field under a first image capturing condition and outputs image capturing data (S302). The first image capturing condition is, for example, an exposure decided in accordance with a photogenic field that is an object for which an image is shot when the release button 6 is pressed. For example, an image capturing condition appropriate for starry sky may be set as the first image capturing condition when the proportion of the starry sky is higher than a land view in the photogenic field.

After S302, the control unit 11 determines whether a celestial image shooting mode has been set (S303). The celestial image shooting mode is appropriate for celestial image shooting and can be set by operating the operation unit 22. In the determination in S303, the scene determination unit 17 may determine whether the scene of a photogenic field for which image shooting is performed is a celestial scene, rather than determining whether the celestial image shooting mode has been set.

When the determination result in S303 is NO, the image processing unit 18 performs normal image processing for an image (which is also a first image) pertaining to the image capturing data output in S302 (S304). The normal image processing is image processing commonly performed in the process of image shooting.

When the determination result in S303 is YES, the control unit 11 performs special image processing (S305). Details of the special image processing will be described hereinafter by referring to FIG. 4.

After S304 or S305, the control unit 11 causes the display unit 3 to display an image resulting from the processing in S304 or S305 and records image data pertaining to this image in, for example, an SD memory card connected to the image input unit 15 (S306).

After S306, the control unit 11 determines whether the power button 5b has been pressed (power-off operation) (S307).

When the determination result in S307 is NO, the process returns to S302.

When the determination result in S307 is YES, the image capturing apparatus 1 is turned off (S308), and the process exemplified in FIG. 3 ends.

Figure 4:
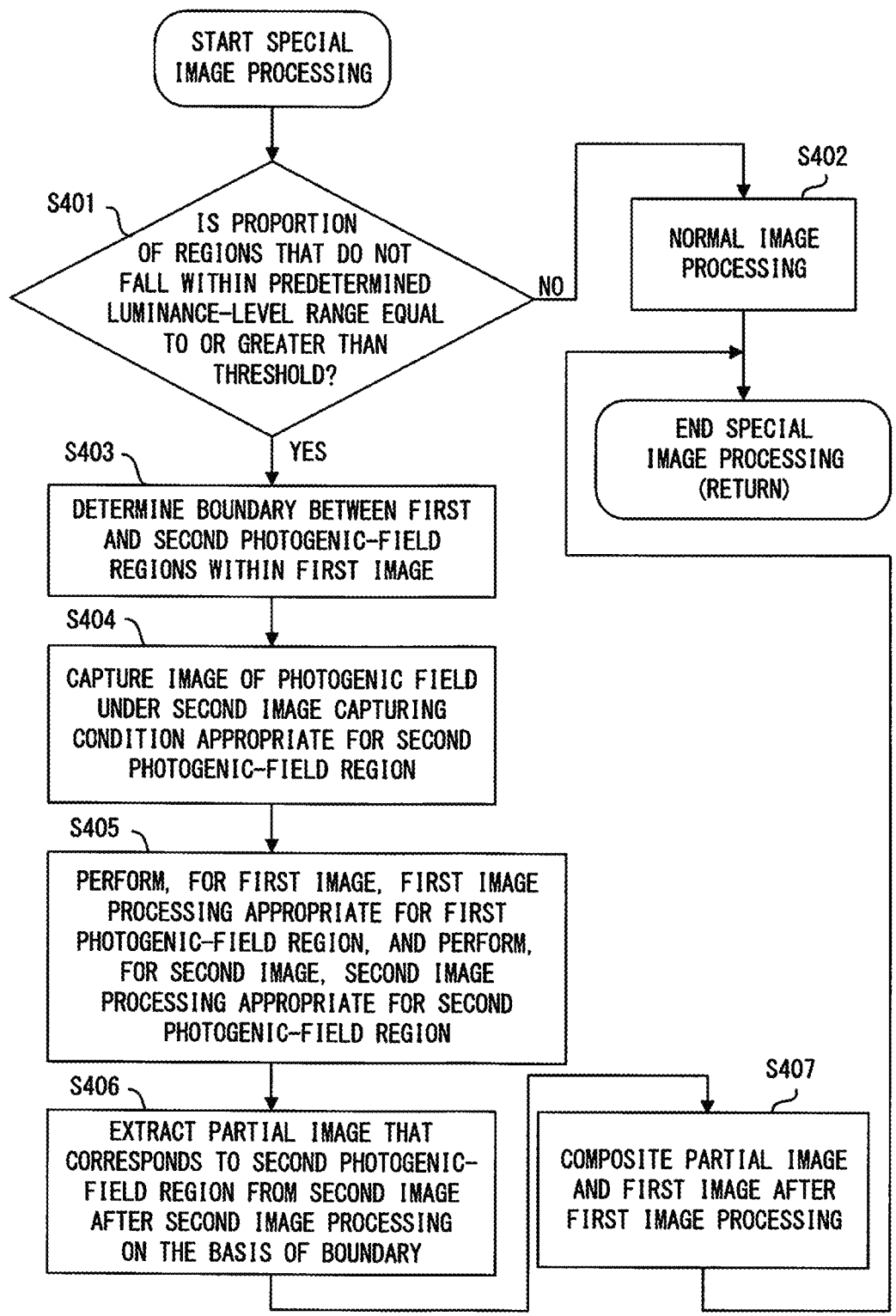
FIG. 4 is a flowchart illustrating special image processing in S305.

FIG. 4 is a flowchart illustrating the special image processing in S305.

In the special image processing exemplified in FIG. 4, the determination unit 11a first determines whether the proportion of regions that do not fall within a predetermined luminance-level range within a first image pertaining to the image capturing data output in S302 is equal to or greater than a threshold (S401). For example, a region that does not fall within the predetermined luminance-level range may be a region having a luminance value of 20 or lower when the luminance value is represented with 8 bits. The threshold is, for example, 20%. With reference to this situation, descriptions will be given of an example of the determination process in S401 by referring to FIG. 5.

Figure 5:
FIG. 5 is an explanatory diagram for an example of a determination process in S401.

FIG. 5 is an explanatory diagram for an example of the determination process in S401.

In the example depicted in FIG. 5, first, a first image 101 is divided into 72 (=8×9) blocks, and an average luminance value is determined for each block. The values within the blocks indicate average luminance values, of which values of 20 or lower are underlined. Then, it is determined whether the number of blocks having an average value of 20 or lower accounts for at least 20% of the total number of blocks. In the example depicted in FIG. 5, the total number of blocks is 72, and the number of blocks having an average value of 20 or lower is 24 and thus accounts for about 33.3% (24/72) of the total, which is greater than the threshold (20%). Note that the first image 101 is an image obtained by capturing a photogenic field that includes starry sky and a land view, wherein a region 101a corresponds to the starry sky, and a region 101b corresponds to the land view.

FIG. 4 should be referred to again. When the determination result in S401 is NO, the image processing unit 18 performs, as in S304, normal image processing for the first image pertaining to the image capturing data output in S302 (S402). In this case, S403-S407 are not performed, and the process returns to the flowchart exemplified in FIG. 3.

When the determination result in S401 is YES, the boundary determination unit 11b determines the boundary between first and second photogenic-field regions within the first image pertaining to the image capturing data output in S302 (S403). An example of this process will be described by referring to FIG. 6.

Figure 6:
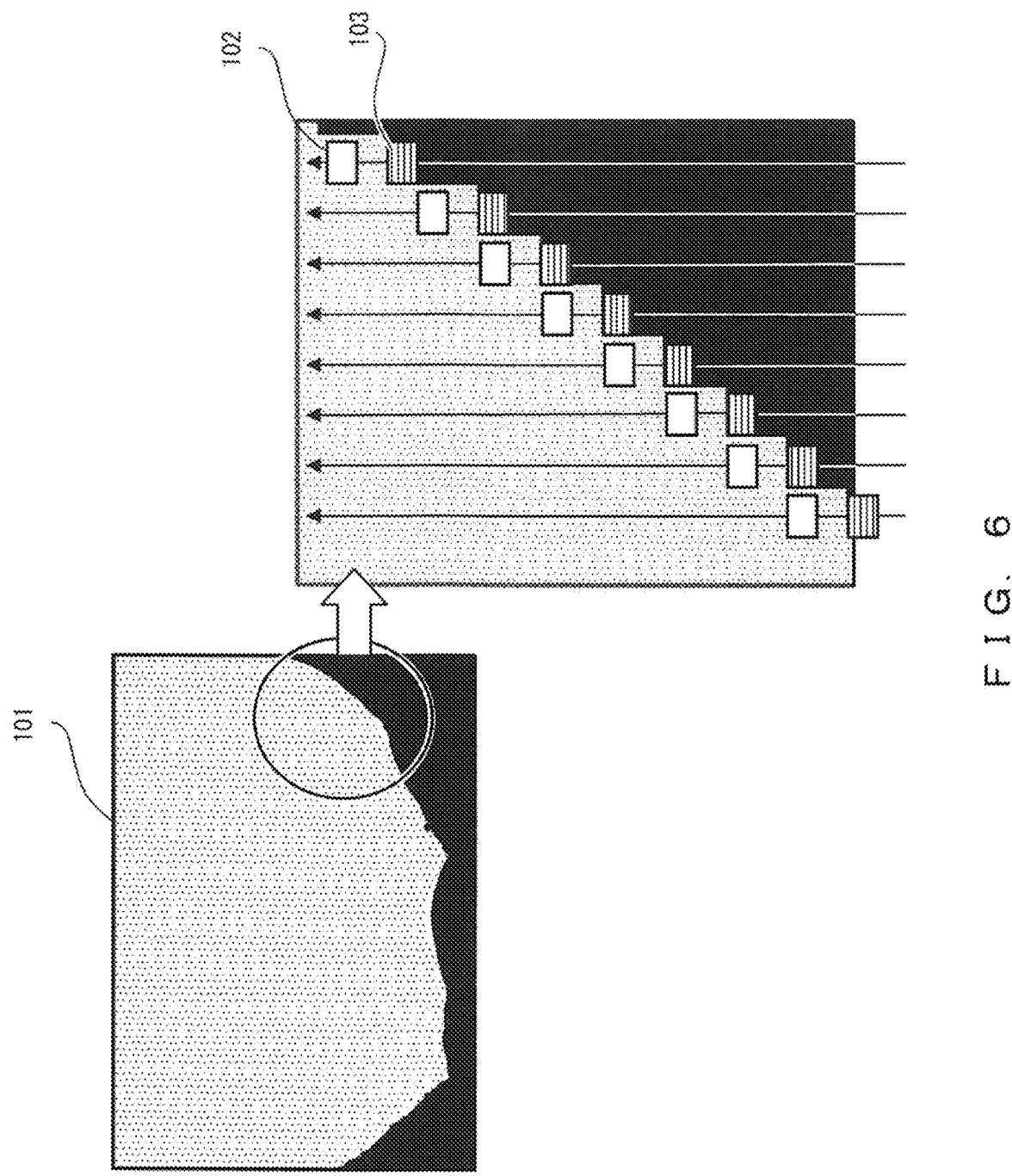
FIG. 6 is an explanatory diagram for an example of a process in S403.

FIG. 6 is an explanatory diagram for an example of the process in S403.

In the example depicted in FIG. 6, the gravity direction of the photogenic field indicated in the first image 101 is a downward direction in the first image 101. The gravity direction is decided on the basis of a result of detection by the orientation sensor 16. A direction opposite to the gravity direction, i.e., an upward direction in the first image 101, is defined as a specific direction. In this example, the boundary determination unit 11b links intermediate positions (intermediate pixel positions) that are each a midpoint between a pair of pixels (e.g., pixels 102 and 103) within the first image 101 that are adjacent to each other in the upward direction with one pixel located therebetween and have a difference in luminance value therebetween equal to or greater than a threshold, thereby determining the boundary between the pixel pairs. For example, the threshold may be 50 when a luminance value is represented with 8 bits. The region that includes pixels that are each a pixel (e.g., pixel 102) of the pair of pixels (e.g., pixels 102 and 103) that have the higher luminance value than the other pixel of the pair of pixels is defined as a first photogenic-field region, i.e., the region 101a depicted in the example of FIG. 5 that corresponds to starry sky. The region that includes pixels that are each a pixel (e.g., pixel 103) of the pair of pixels (e.g., pixels 102 and 103) that have the lower luminance value than the other pixel of the pair of pixels is defined as a second photogenic-field region, i.e., the region 101b depicted in the example of FIG. 5 that corresponds to a land view.

FIG. 4 should be referred to again. After S403, the image capturing unit 14 captures an image of the photogenic field under a second image capturing condition appropriate for the second photogenic-field region and outputs image capturing data (S404). The time period between the image capturing in S302 and the image capturing in S404 is quite short, and images of the same photogenic field are captured in S404 and S302.

Figure 7:
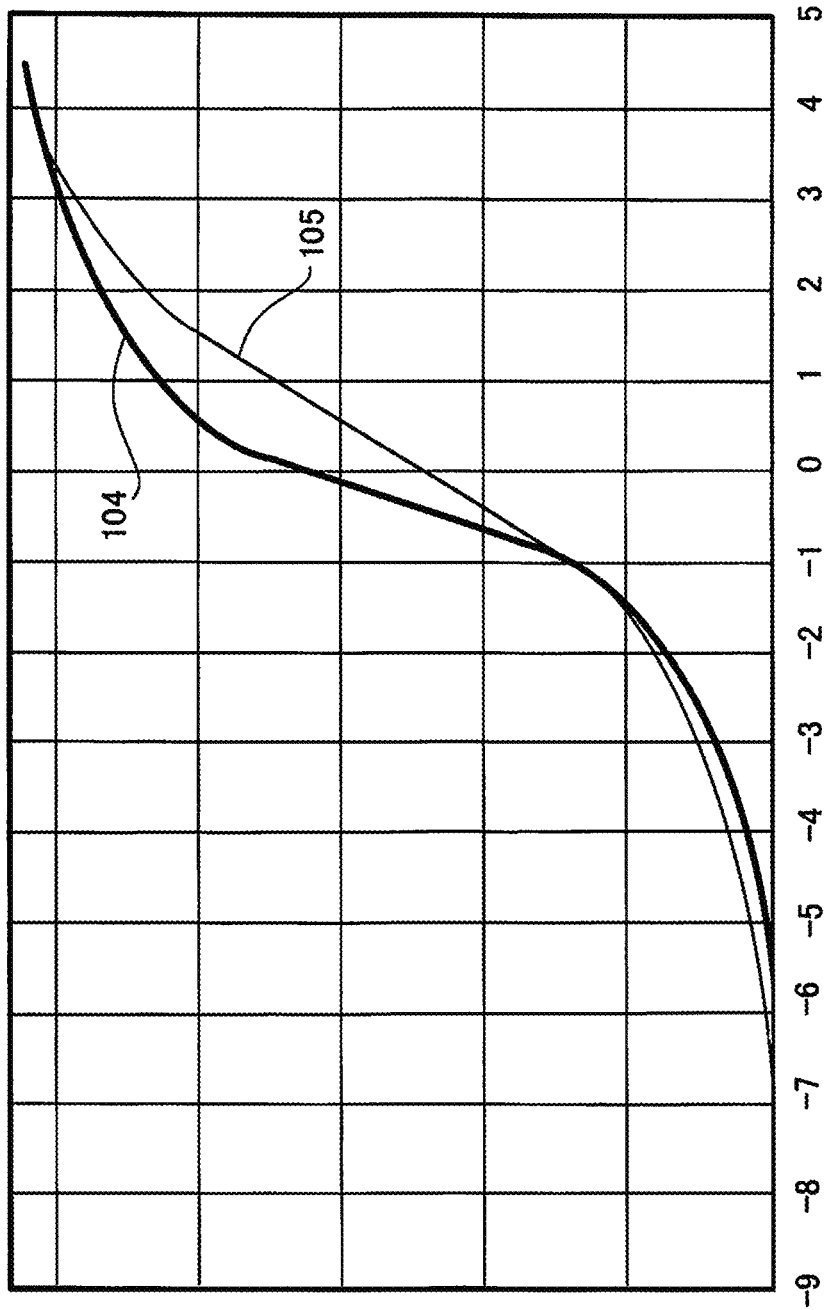
FIG. 7 exemplifies a tone curve appropriate for starry sky and a tone curve appropriate for a land view.

After S404, the image processing unit 18 performs, for the first image pertaining to the image capturing data output in S302, first image processing appropriate for the first photogenic-field region and performs, for a second image pertaining to the image capturing data output in S404, second image processing appropriate for the second photogenic-field region (S405). The first image processing includes one of or both image processing that depends on a tone curve appropriate for starry sky and image processing that depends on WB appropriate for starry sky. The second image processing includes one of or both image processing that depends on a tone curve appropriate for a land view and image processing that depends on WB appropriate for the land view. The WB appropriate for starry sky is, for example, one for increasing blueness by about 3000 K, and the WB appropriate for the land view is, for example, AWB. FIG. 7 exemplifies a tone curve appropriate for starry sky and a tone curve appropriate for a land view.

FIG. 7 exemplifies the two tone curves.

As exemplified in FIG. 7, a tone curve 104 appropriate for starry sky and a tone curve 105 appropriate for a land view are different, and the tone curve 104 appropriate for starry sky is sloped more steeply in an intermediate range than the tone curve 105 appropriate for a land view.

FIG. 4 should be referred to again. After S405, the image extraction unit 19 extracts a partial image that corresponds to the second photogenic-field region from the second image after the second image processing on the basis of the boundary determined in S403 (S406).

After S406, the image compositing unit 20 composites the partial image extracted in S406 and the first image after the first image processing (S407). In particular, the partial image extracted in S406 is superimposed on the second photogenic-field region within the first image after the first image processing. An example of this process is described in the following by referring to FIG. 8.

Figure 8:
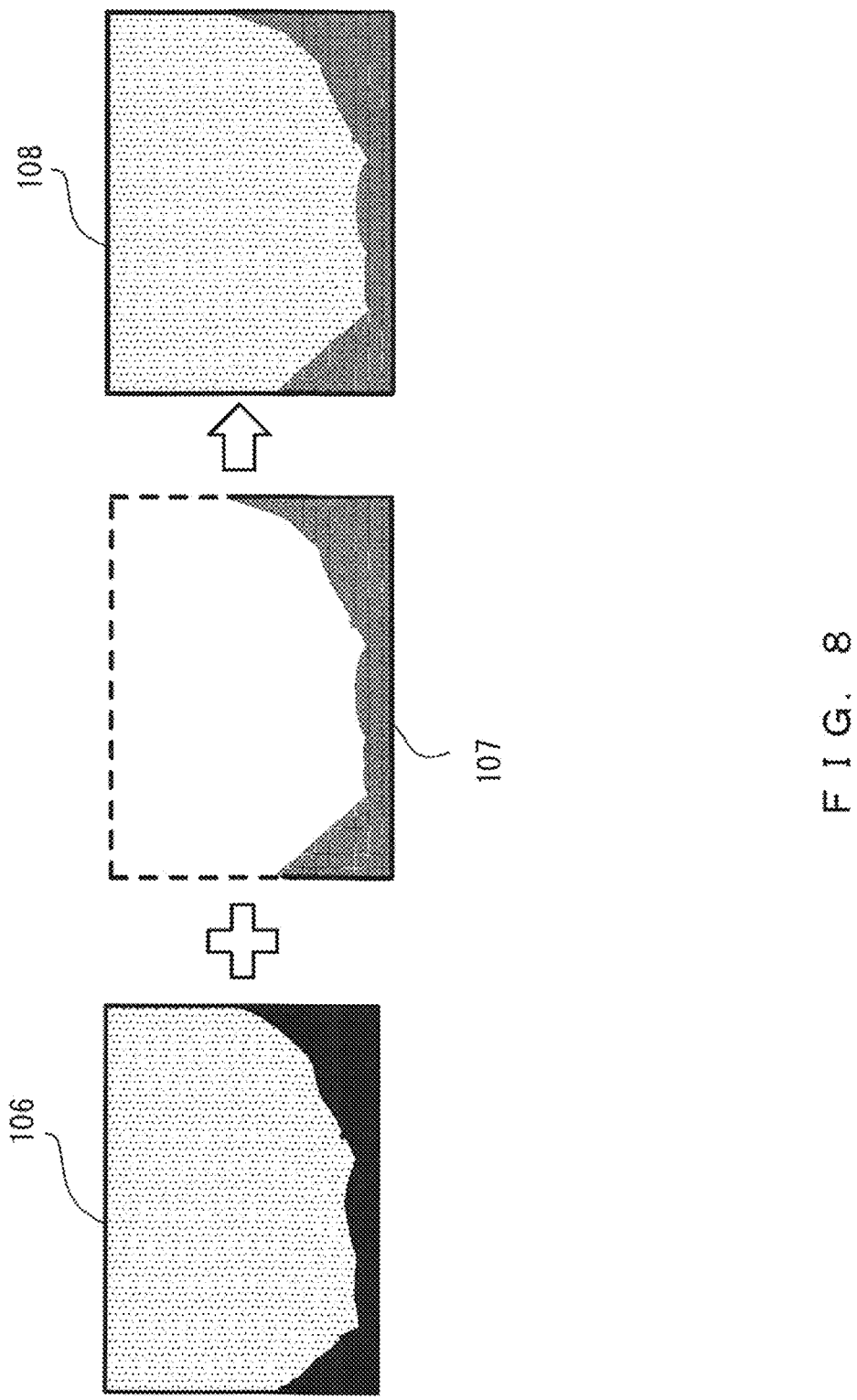
FIG. 8 is an explanatory diagram for an example of a process in S407.

FIG. 8 is an explanatory diagram for an example of the process in S407.

In the example depicted in FIG. 8, a partial image extracted in S406 is superimposed on a second photogenic-field region within a first image 106 after the first image processing, thereby producing a composite image 108. Accordingly, the composite image 108 includes, as a region that corresponds to starry sky, an image that has been captured under an image capturing condition appropriate for starry sky and undergone image processing appropriate for starry sky and includes, as a region that corresponds to a land view, an image that has been captured under an image capturing condition appropriate for the land view and undergone image processing appropriate for the land view.

FIG. 4 should be referred to again. After S402 or S407, the process returns to the flowchart exemplified in FIG. 3.

As described above, the present embodiment allows a star view image in which both starry sky and a land view are shown with optimum brightness to be easily captured. Intermediate positions that are each a midpoint between a pair of pixels that are adjacent to each other in a specific direction (or adjacent to each other in the specific direction with one or more pixels located therebetween) and have a difference in luminance value therebetween equal to or greater than a threshold are linked to determine the boundary between first and second photogenic-field regions, so that a star view image in which the boundary between starry sky and a land view are accurately reproduced can be acquired.

Various changes can be made to the present embodiment.

For example, the flowchart exemplified in FIG. 3 may be arranged in a manner such that the process shifts to S305 after S302 is performed with S303 and S304 skipped.

For example, the image extraction unit 19 may extract a partial image that corresponds to a second photogenic-field region from a second image on the basis of a boundary determined by the boundary determination unit 11b. In this case, the image processing unit 18 performs, for a first image, first image processing appropriate for a first photogenic-field region and performs, for the partial image extracted from the second image by the image extraction unit 19, second image processing appropriate for the second photogenic-field region. The image compositing unit 20 composites the first image after the first image processing and the partial image after the second image processing. Such processes may be performed when the celestial image shooting mode has been set or when the scene determination unit 17 has determined that the scene of the photogenic field is a celestial scene and the determination unit 11a has determined that the proportion of regions within the first image that do not fall within a predetermined luminance-level range is equal to or greater than a threshold. Alternatively, such processes may be performed simply when the determination unit 11a has determined that the proportion of regions within the first image that do not fall within a predetermined luminance-level range is equal to or greater than a threshold. In this example, a boundary is determined on the basis of an image. However, a boundary may be determined using information other than an image. A boundary may be determined in consideration of characteristics of an object, shading or gloss caused by a light source, distance distributions, or the like.

For example, when the image extraction unit 19 extracts, as described above, a partial image that corresponds to a second photogenic-field region from a second image on the basis of a boundary determined by the boundary determination unit 11b, the image compositing unit 20 may simply composite the extracted partial image and a first image without the image processing unit 18 performing the first and second image processing. Such processes may be performed when the celestial image shooting mode has been set or when the scene determination unit 17 has determined that the scene of the photogenic field is a celestial scene and the determination unit 11a has determined that the proportion of regions within the first image that do not fall within a predetermined luminance-level range is equal to or greater than a threshold. Alternatively, such processes may be performed simply when the determination unit 11a has determined that the proportion of regions within the first image that do not fall within a predetermined luminance-level range is equal to or greater than a threshold.

For example, when a plurality of images shot at different exposures are input via the image input unit 15, the processes may be performed using images selected as first and second images from the plurality of images, instead of using the above-described first and second images. In this case, first and second images are acquired without the image capturing unit 14 performing image capturing, and the processes of S403 and S405-S407 exemplified in FIG. 4 are performed using the two images.

For example, when bulb image shooting is performed using the image capturing apparatus 1, an image pertaining to image capturing data acquired at the start of the bulb image shooting may be selected as a first image, and then, at the moment at which image capturing data that can be addressed as a second image is acquired during the bulb image shooting, an image pertaining to the image capturing data may be selected as second data; and under this condition, the processes of S403 and S405-S407 exemplified in FIG. 4 can be performed to produce a composite image. In this case, the second image can be acquired without waiting for the completion of the process of S403.

For example, when auto bracket image shooting is performed using the image capturing apparatus 1, an image pertaining to image capturing data acquired at the start of the auto bracket image shooting may be selected as a first image, and then, at the moment at which image capturing data that can be addressed as a second image is acquired during the auto bracket image shooting, an image pertaining to the image capturing data may be selected as a second data; and under this condition, the processes of S403 and S405-S407 exemplified in FIG. 4 can be performed to produce a composite image. Also in this case, the second image can be acquired without waiting for the completion of the process of S403.

Photogenic fields for which images are captured are not limited to those in which starry sky is located on one side thereof and a land view is located on the other side thereof, like, for example, the photogenic field indicated in the first image 101 in FIG. 5. For example, a photogenic field for which an image is captured may be one in which starry sky is located on the central portion thereof and a land view is located on the edge portions thereof (this photogenic field will hereinafter be referred to as a photogenic field A). The photogenic field A is estimated to be provided when, for example, an image of starry sky is shot within a cave through the entrance thereof. In another example, a photogenic field for which an image is captured may be one in which starry sky is located on the upper portion thereof, a land view is located on the central portion thereof, and sea or lake, i.e., an object with brightness similar to that of starry sky, is located on the lower portion thereof (this photogenic field will hereinafter be referred to as a photogenic field B). The photogenic field B is estimated to be provided when, for example, the image capturing apparatus is faced in the direction from a lake shore to the other shore so as to shoot images of the lake, the land view of the opposite shore, and starry sky. In the described examples, image regions need to be represented differently between starry sky and a land view. A region of starry sky or a land view may be, as a matter of course, divided into divisions so that different image processing can be performed for each of these divisions. For example, the image processing may need to be the adjusting of the representations of colors and brightness. Illumination light such as auxiliary light may be emitted on an as-needed basis.

Figure 9:
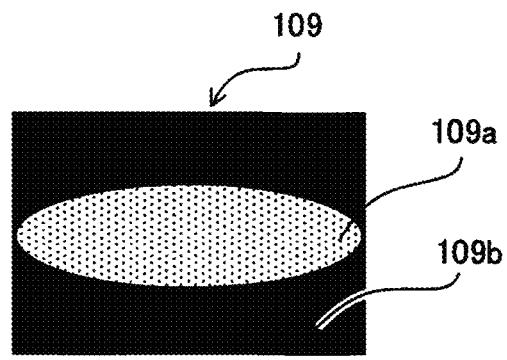
FIG. 9 exemplifies a first image acquired by capturing an image of a photogenic field A.
Figure 10:
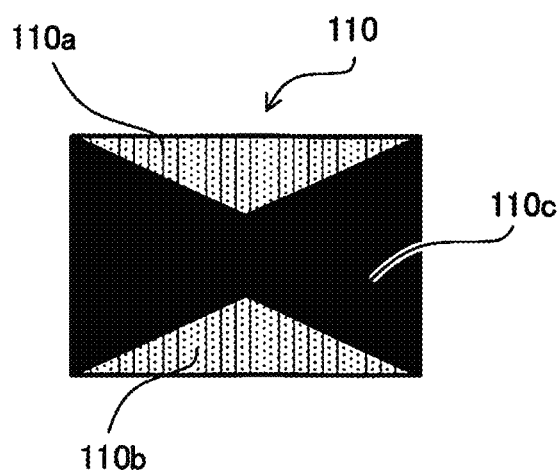
FIG. 10 exemplifies a first image acquired by capturing an image of a photogenic field B.

FIG. 9 exemplifies a first image acquired by capturing an image of a photogenic field A. FIG. 10 exemplifies a first image acquired by capturing an image of a photogenic field B.

A first image 109 exemplified in FIG. 9 is such that a region 109a on the central portion thereof is defined as a first photogenic-field region and a region 109b on the edge portions thereof is defined as a second photogenic-field region. A first image 110 exemplified in FIG. 10 is such that a region 110a on the upper portion thereof and a region 110b on the lower portion thereof are defined as first photogenic-field regions and a region 110c on the central portion thereof is defined as a second photogenic-field region.

A specific direction may be decided on the basis of specific-direction definition information. Specific-direction definition information defines a specific direction that depends on the gravity direction of a photogenic field indicated in the first image. For example, specific-direction definition information may define a specific direction in accordance with which of a plurality of divisions of a 360°-angle region the gravity direction of the photogenic field indicated in the first image corresponds to.

Figure 11:
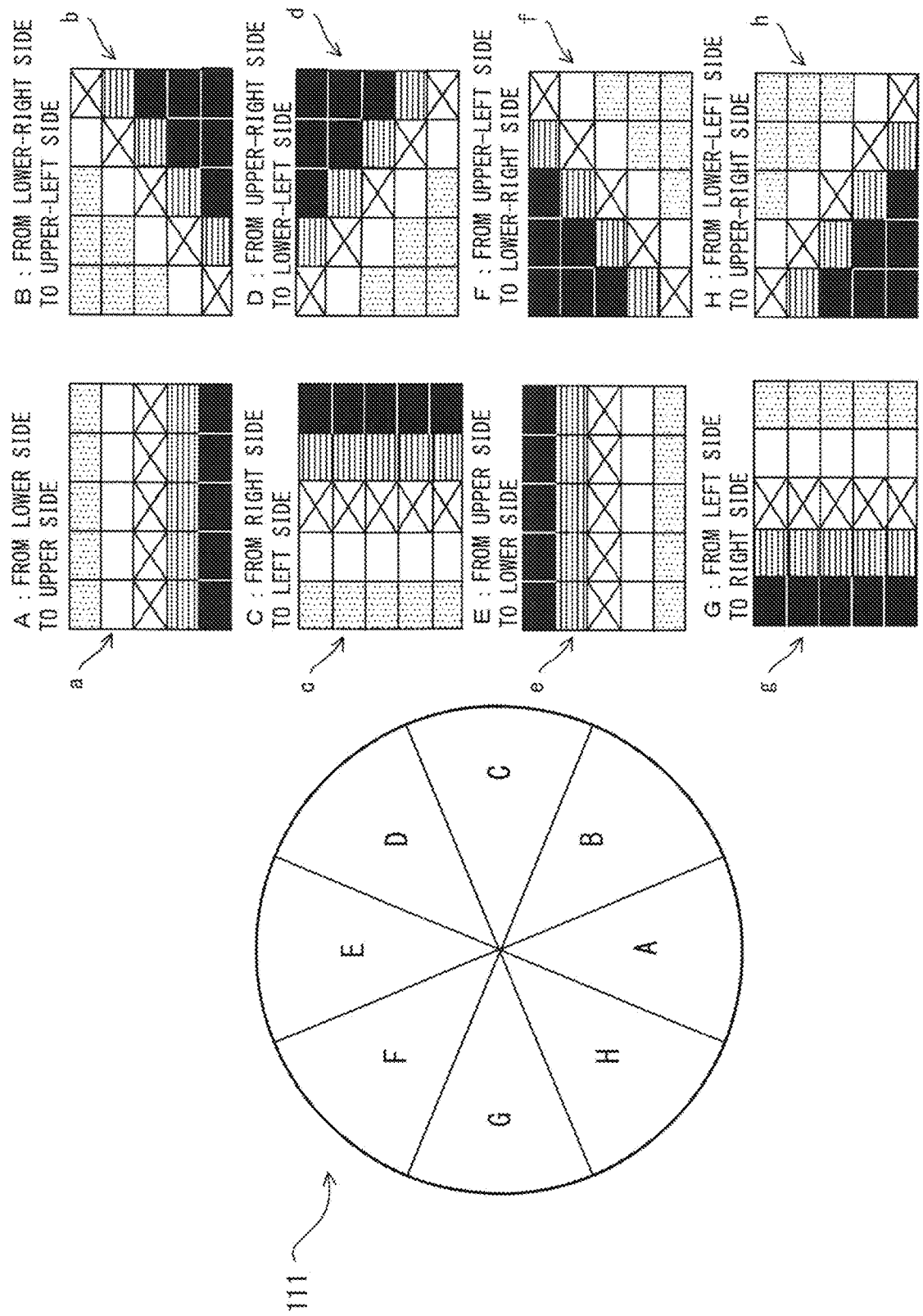
FIG. 11 schematically illustrates an example of specific-direction definition information.

FIG. 11 schematically illustrates an example of specific-direction definition information.

In the example of specific-direction definition information schematically indicated in FIG. 11, a 360°-angle region is divided into eight angular ranges (see equally dividing pattern 111), and a specific direction is defined in accordance which of the angular ranges the gravity direction of the photogenic field indicated in the first image is included in.

In this example, when the gravity direction is included in an angular range A (downward direction or essentially downward direction), the specific direction is defined as the upward direction (from the lower side to the upper side), and intermediate positions that are each a midpoint between a pair of pixels that are adjacent to each other in the upward direction with one pixel located therebetween and have a difference in luminance value therebetween equal to or greater than a threshold are linked to determine the boundary (see partial image a).

When the gravity direction is included in an angular range B (downward-right direction or essentially downward-right direction), the specific direction is defined as the upward-left direction (from the lower-right side to the upper-left side), and intermediate positions that are each a midpoint between a pair of pixels that are adjacent to each other in the upward-left direction and have a difference in luminance value therebetween equal to or greater than a threshold are linked to determine the boundary (see partial image b).

When the gravity direction is included in an angular range C (rightward direction or essentially rightward direction), the specific direction is defined as the leftward direction (from the right side to the left side), and intermediate positions that are each a midpoint between a pair of pixels that are adjacent to each other in the leftward direction with one pixel located therebetween and have a difference in luminance value therebetween equal to or greater than a threshold are linked to determine the boundary (see partial image c).

When the gravity direction is included in an angular range D (upward-right direction or essentially upward-right direction), the specific direction is defined as the downward-left direction (from the upper-right side to the lower-left side), and intermediate positions that are each a midpoint between a pair of pixels that are adjacent to each other in the downward-left direction and have a difference in luminance value therebetween equal to or greater than a threshold are linked to determine the boundary (see partial image d).

When the gravity direction is included in an angular range E (upward direction or essentially upward direction), the specific direction is defined as the downward direction (from the up side to the down side), and intermediate positions that are each a midpoint between a pair of pixels that are adjacent to each other in the downward direction with one pixel located therebetween and have a difference in luminance value therebetween equal to or greater than a threshold are linked to determine the boundary (see partial image e).

When the gravity direction is included in an angular range F (upward-left direction or essentially upward-left direction), the specific direction is defined as the downward-right direction (from the upper-left side to the lower-right side), and intermediate positions that are each a midpoint between a pair of pixels that are adjacent to each other in the downward-right direction and have a difference in luminance value therebetween equal to or greater than a threshold are linked to determine the boundary (see partial image f).

When the gravity direction is included in an angular range G (leftward direction or essentially leftward direction), the specific direction is defined as the rightward direction (from the left side to the right side), and intermediate positions that are each a midpoint between a pair of pixels that are adjacent to each other in the rightward direction with one pixel located therebetween and have a difference in luminance value therebetween equal to or greater than a threshold are linked to determine the boundary (see partial image g).

When the gravity direction is included in an angular range H (downward-left direction or essentially downward-left direction), the specific direction is defined as the upward-right direction (from the lower-left side to the upper-right side), and intermediate positions that are each a midpoint between a pair of pixels that are adjacent to each other in the upward-right direction and have a difference in luminance value therebetween equal to or greater than a threshold are linked to determine the boundary (see partial image h).

In the example schematically depicted in FIG. 11, thus, the specific direction is defined as any of the eight directions in accordance with the gravity direction.

The specific direction may be any of the directions defined for the individual regions within the first image, irrespective of the gravity direction of the photogenic field indicated in the first image. The specific direction may be decided with reference to, besides gravity direction, an analysis of the orientation of image shooting, characteristics of an object, distance distributions within the screen, environmental light, or the like. Especially when strong shading occurs due to the influence of illumination light, it will be difficult to reproduce appropriate images of individual regions. Hence, the boundary between the regions may be determined in consideration of the presence/absence of a lighting or the influence thereof.

Figure 12:
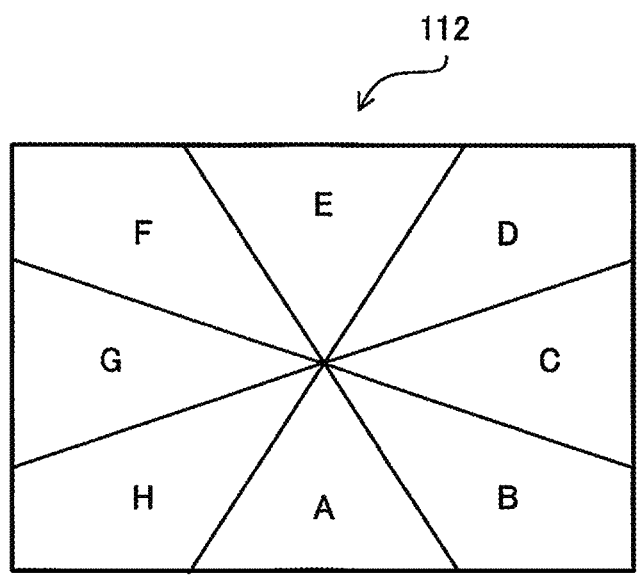
FIG. 12 is an explanatory diagram for an example in which a specific direction is defined for each region within a first image.

FIG. 12 is an explanatory diagram for an example in which a specific direction is defined for each region within a first image.

In the example depicted in FIG. 12, a first image 112 is divided into eight regions, as seen in the equally dividing pattern 111 depicted in FIG. 11, wherein: the specific direction of a region A is an upward direction; a region B, an upward-left direction; a region C, a leftward direction; a region D, downward-left direction; a region E, a downward direction; a region F, a downward-right direction; a region G, a rightward direction; a region H, an upward-right direction. This example will be preferable when, for example, the first image 112 is an image obtained by imaging a photogenic field in which, as seen in the first image 109 exemplified in FIG. 9, starry sky is indicated in a photogenic field A that is the central portion and a land view is indicated around the starry sky.

Embodiments are not simply limited to the those described above, and components of the embodiments may be varied in an implementation phase without departing from the gist of thereof. Components disclosed with reference to the described embodiments and variations may be combined, as appropriate, to provide various embodiments. For example, some of the components indicated with reference to an embodiment may be omitted. In addition, components of different embodiments may be combined as appropriate.

The embodiments are not limited to use in celestial image shooting and can be applied to image shooting performed in an environment where the luminance of some portions of a captured image are different from that of the other portions of this image or every portion of the captured image has a different luminance, e.g., image shooting in which auxiliary light is used under a dark environment, such as the image shooting of the inside of a human or animal body organ or the image shooting of the inside of a machine or pipe.

What is claimed is:
1. An image capturing apparatus comprising:
an image capturing circuit that outputs image capturing data by capturing an image of a photogenic field;
a boundary determination circuit that determines a boundary between first and second photogenic-field regions within a first image pertaining to image capturing data output by the image capturing circuit capturing an image of the photogenic field under a first image capturing condition;
an image extraction circuit that extracts a partial image corresponding to the second photogenic-field region from a second image on the basis of the boundary; and
an image compositing circuit that composites the first image and the partial image.
2. The image capturing apparatus of claim 1, wherein the second image pertains to image capturing data output by the image capturing circuit capturing an image of the photogenic field under a second image capturing condition appropriate for the second photogenic-field region.
3. The image capturing apparatus of claim 1, further comprising:
an image processing circuit that performs, for the first image, first image processing appropriate for the first photogenic-field region and performs, for the partial image, second image processing appropriate for the second photogenic-field region, wherein
the image compositing circuit composites the first image after the first image processing and the partial image after the second image processing.
4. The image capturing apparatus of claim 1, further comprising:
an image capturing circuit that performs, for the first image, first image processing appropriate for the first photogenic-field region and performs, for a second image, second image processing appropriate for the second photogenic-field region, the second image pertaining to image capturing data output by the image capturing circuit capturing an image of the photogenic field under a second image capturing condition appropriate for the second photogenic-field region, wherein
the image extraction circuit extracts a partial image corresponding to the second photogenic-field region from the second image after the second image processing on the basis of the boundary, and
the image compositing circuit composites the first image after the first image processing and the partial image.

5. The image capturing apparatus of claim 1, wherein
the boundary determination circuit determines the boundary by linking intermediate positions that are each a midpoint between a pair of pixels within the first image that are adjacent to each other in a specific direction and have a difference in luminance value therebetween equal to or greater than a threshold, and
the first photogenic-field region includes pixels that are each a pixel of the pair of pixels that have a higher luminance value than the other pixel of the pair of pixels, and the second photogenic-field region includes pixels that are each a pixel of the pair of pixels that have a lower luminance value than the other pixel of the pair of pixels.

6. The image capturing apparatus of claim 5, wherein
the specific direction is decided on the basis of a gravity direction of a photogenic field indicated in the first image.

7. The image capturing apparatus of claim 6, wherein
the specific direction is decided on the basis of specific-direction definition information defining a specific direction that depends on the gravity direction.

8. The image capturing apparatus of claim 6, wherein
the specific direction is a direction opposite to the gravity direction.

9. The image capturing apparatus of claim 6, further comprising:
an orientation detection circuit that detects an orientation of the image capturing apparatus, wherein
the gravity direction is decided on the basis of a result of detection by the orientation detection circuit.

10. The image capturing apparatus of claim 1, wherein
the boundary determination circuit determines the boundary by linking intermediate positions that are each a midpoint between a pair of pixels within the first image that are adjacent to each other in a specific direction with one or more pixels located therebetween and have a difference in luminance value therebetween equal to or greater than a threshold, and
the first photogenic-field region includes pixels that are each a pixel of the pair of pixels that have a higher luminance value than the other pixel of the pair of pixels, and the second photogenic-field region includes pixels that are each a pixel of the pair of pixels that have a lower luminance value than the other pixel of the pair of pixels.

11. The image capturing apparatus of claim 1, further comprising:
an operation member that accepts a user operation, wherein
the boundary determination circuit, the image extraction circuit, and the image compositing circuit perform processing when a celestial image shooting mode is set in accordance with an operation accepted by the operation member.

12. The image capturing apparatus of claim 1, further comprising:
a scene determination circuit that determines a scene of the photogenic field, wherein
the boundary determination circuit, the image extraction circuit, and the image compositing circuit perform processing when the scene determination circuit has determined that the scene of the photogenic field is a celestial scene.

13. The image capturing apparatus of claim 1, further comprising:
a determination circuit that determines whether a proportion of regions that do not fall within a predetermined luminance-level range within the first image is equal to or greater than a threshold, wherein
the boundary determination circuit, the image extraction circuit, and the image compositing circuit perform processing when the determination unit has determined that the proportion is equal to or greater than the threshold.

14. The image capturing apparatus of claim 1, wherein
the first photogenic-field region corresponds to starry sky, and
the second photogenic-field region corresponds to a land view.

15. The image capturing apparatus of claim 1, wherein
the first image processing includes one of or both image processing that depends on a tone curve appropriate for starry sky and image processing that depends on white balancing appropriate for starry sky, and
the second image processing includes one of or both image processing that depends on a tone curve appropriate for a land view and image processing that depends on white balancing appropriate for a land view.

16. The image capturing apparatus of claim 1, further comprising:
an interface used to input a plurality of images shot at different exposures, wherein
the processes are performed using, instead of the first and second images, images selected from the plurality of images as first and second images.

17. An image compositing method implemented by an image capturing apparatus that includes an image capturing circuit for outputting image capturing data by capturing an image of a photogenic field, the image compositing method comprising:
determining a boundary between first and second photogenic-field regions within a first image pertaining to image capturing data output by the image capturing circuit capturing an image of the photogenic field under a first image capturing condition;
performing, for the first image, first image processing appropriate for the first photogenic-field region and performing, for a second image, second image processing appropriate for the second photogenic-field region, the second image pertaining to image capturing data output by the image capturing circuit capturing an image of the photogenic field under a second image capturing condition appropriate for the second photogenic-field region; and
extracting a partial image corresponding to the second photogenic-field region from the second image after the second image processing on the basis of the boundary; and
compositing the first image after the first image processing and the partial image.

18. A non-transitory computer-readable recording medium having recorded therein an image compositing program to be executed by a computer of an image capturing apparatus that includes an image capturing circuit for outputting image capturing data by capturing an image of a photogenic field, the program causing the computer to execute a process comprising:
- determining a boundary between first and second photogenic-field regions within a first image pertaining to image capturing data output by the image capturing circuit capturing an image of the photogenic field under a first image capturing condition;
- performing, for the first image, first image processing appropriate for the first photogenic-field region and performing, for a second image, second image processing appropriate for the second photogenic-field region, the second image pertaining to image capturing data output by the image capturing circuit capturing an image of the photogenic field under a second image capturing condition appropriate for the second photogenic-field region; and
- extracting a partial image corresponding to the second photogenic-field region from the second image after the second image processing on the basis of the boundary; and
- compositing the first image after the first image processing and the partial image.

\* \* \* \* \*